June 11, 1935. R. T. ROMINE Re. 19,606
INDUSTRIAL TRUCK
Original Filed March 2, 1927 4 Sheets-Sheet 1
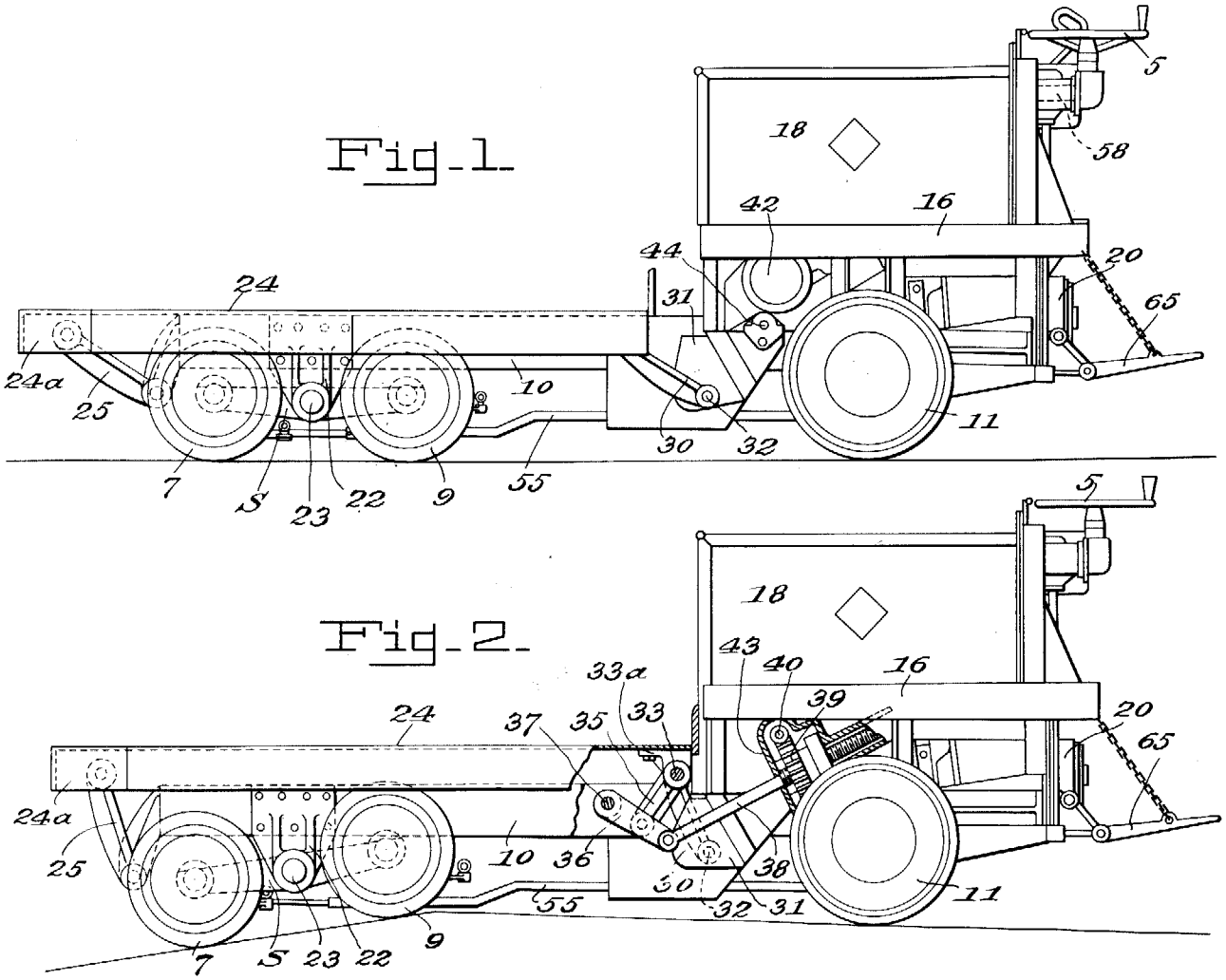
INVENTOR=
Robert T. Romine
BY Macleod, Calver, Copeland & Dike
C3 ATTORNEYS.

June 11, 1935. R. T. ROMINE Re. 19,606

INDUSTRIAL TRUCK

Original Filed March 2, 1927 4 Sheets-Sheet 2

INVENTOR=
Robert T. Romine
BY Macleod, Colver, Copeland & Dike
C3 ATTORNEYS.

June 11, 1935. R. T. ROMINE Re. 19,606

INDUSTRIAL TRUCK

Original Filed March 2, 1927 4 Sheets-Sheet 3

INVENTOR:
Robert T. Romine
by Macleod, Calver, Copeland & Duke
C3 ATTORNEYS-

June 11, 1935. R. T. ROMINE Re. 19,606

INDUSTRIAL TRUCK

Original Filed March 2, 1927 4 Sheets-Sheet 4

INVENTOR=
Robert T. Romine
by Macleod, Calver, Copeland & Dike
C3 ATTORNEYS

Reissued June 11, 1935 Re. 19,606

UNITED STATES PATENT OFFICE 19,606

INDUSTRIAL TRUCK

Robert T. Romine, Mount Clemens, Mich., assignor to Material Handling, Inc., Wilmington, Del., a corporation of Delaware Original No. 1,709,741, dated April 16, 1929, Serial No. 172,165, March 2, 1927. Application for reissue July 20, 1929, Serial No. 379,859

42 Claims. (Cl. 180—22)

This invention relates to industrial trucks and more particularly to that class having a relatively low load elevating or lift platform adapted to be inserted or propelled beneath a loaded portable platform for elevating the same, and thereafter transporting the platform with its load to a predetermined point of delivery.

Trucks of this distinct type in the art are illustrated, for instance, in the patent to Towson No. 1,233,824, granted July 17, 1927. This type of truck is characterized not only by its relatively low platform, usually of the elevating or lift type, but by the concentration of the greater portion of the load directly upon relatively small wheels arranged beneath or underneath the platform, which wheels are ordinarily dirigible for the purpose of steering the truck. Another characteristic feature of the truck is the arrangement of the traction or driving wheels at the rear of the main frame upon which an upright battery housing is usually mounted. Heretofore many difficulties have been experienced in the operation of trucks of this character where the load is concentrated upon a pair of small dirigible load supporting wheels underneath the platform. When run under heavy load on factory floors or freight car floors the load wheels often break through the flooring. The load tends frequently to tilt the truck, raising the driving wheels slightly from the ground and destroying their driving engagement with the ground, or to tip the load sidewise off onto the ground. These difficulties have limited materially the truck capacity and have restricted their field of usefulness to a considerable extent.

An object of this invention is to provide a power driven truck of the foregoing type having a load elevating or lift platform and operating mechanism therefor capable of lifting and transporting heavy loads, such as five to ten tons, and loads of even greater weight, and in which the truck is provided with a multiple number of wheels spaced longitudinally of the truck beneath the load elevating platform capable of widely distributing the weight of the load and capable of relative vertical articulation beneath the lift platform.

A further object of the invention is to arrange the longitudinally spaced wheels so that they are carried upon a rocking carrier or members and, if the latter, with the members united to form a unit. Furthermore, the rocking carrier, which may be termed a sub-frame, is preferably mounted so that its axis of rocking movement is substantially fixed with relation to the forwardly extending main frame of the truck, thus insuring a substantially constant range of lift for the lift platform under varying loads. In other words, the weight of the load will not compress to any considerable extent yielding springs or the like, and thus render uncertain the extent to which the load will be lifted when the platform is raised.

By virtue of this invention the lift truck is capable of operating over uneven ground while maintaining the lift platform substantially level, thus minimizing the danger of the load becoming displaced or falling off the platform. Furthermore, the load is widely distributed by means of longitudinally spaced small diameter wheels facilitating steering of the truck and enabling a truck of capacity such as ten tons to be operated and steered with ease even under capacity loads.

Other objects of this invention will appear in the following description and appended claims, reference being had to the accompanying drawings forming a part of this specification wherein like reference characters designate corresponding parts in the several views.

In said drawings:

Fig. 1 is a side elevation of an industrial truck of the load elevating platform type embodying my invention.

Fig. 2 is a similar view illustrating the load elevating platform in raised position.

Figure 3:
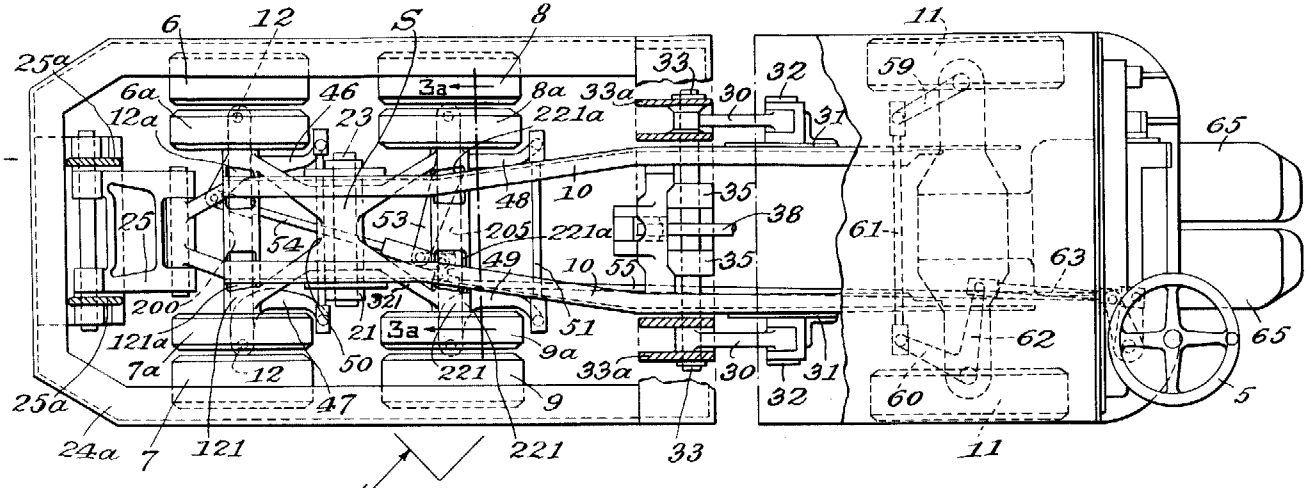
Fig. 3 is a plan view partly broken away of the construction shown in Figs. 1 and 2.
Figure 3A:
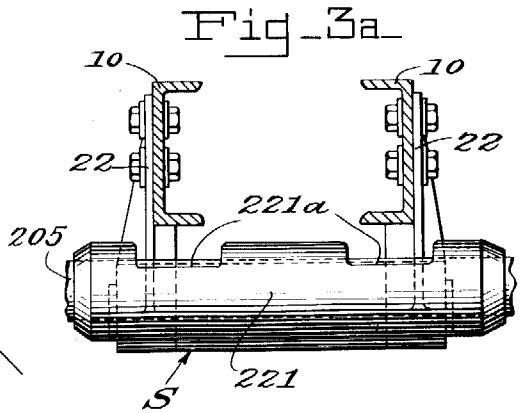

Fig. 3*a* is a transverse section of the chassis and sub-frame taken substantially along the line 3*a*—3*a* of Fig. 3.

Figure 4:
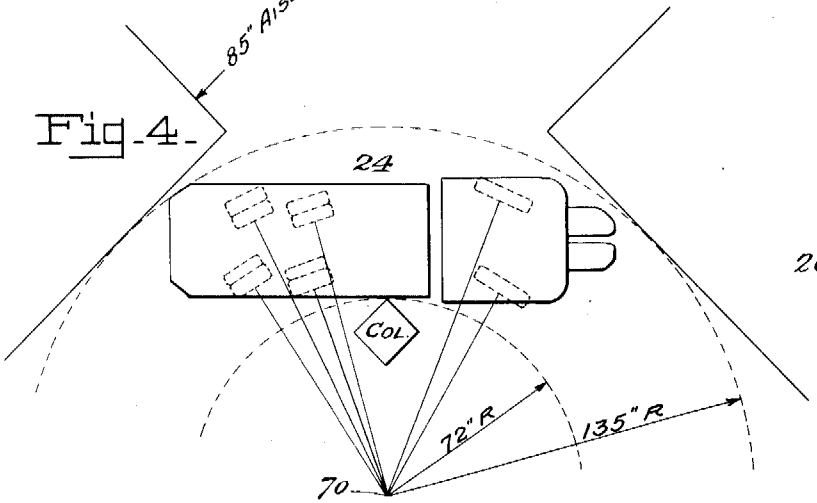

Fig. 4 is a diagrammatic view illustrating the steering adaptability of the truck in the aisles of a factory.

Figure 5:
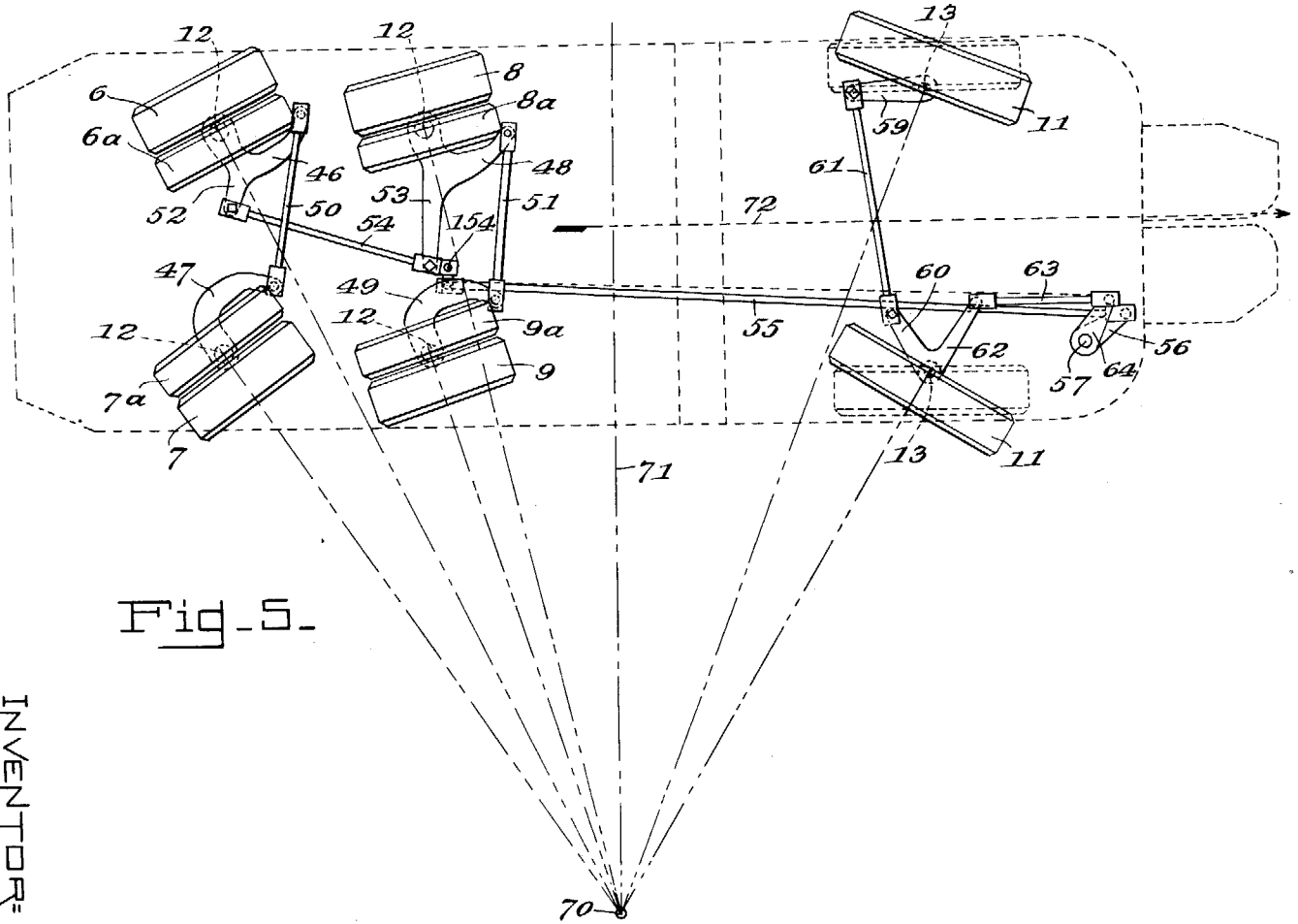

Fig. 5 is a diagrammatic plan view showing the manner in which the load carrying wheels and driving wheels are steered.

Figure 6:
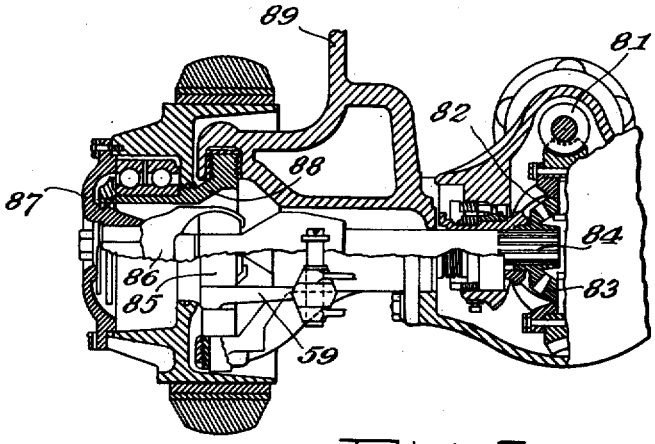

Fig. 6 is a fragmentary transverse section showing the rear end transmission for the driving wheels.

Figure 7:
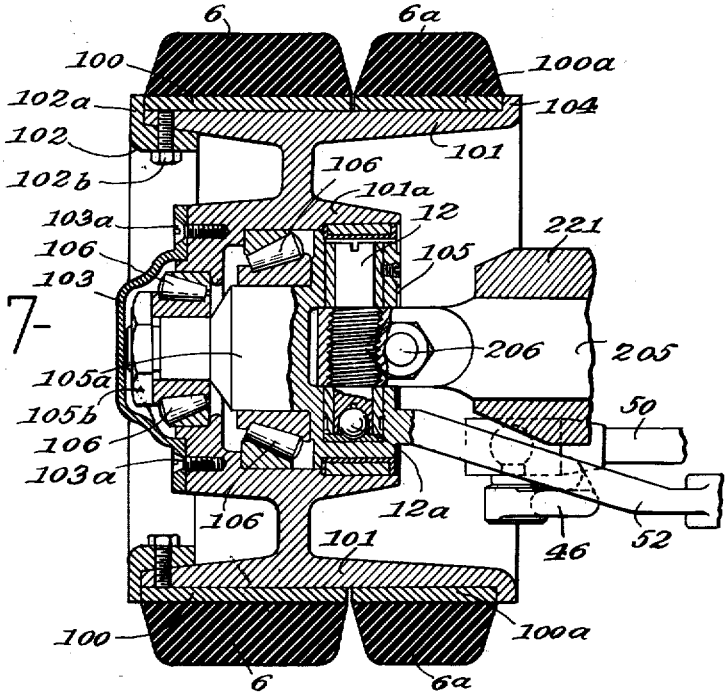

Fig. 7 is a sectional view showing a manner in which the pairs of load elevating wheels may be constructed.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring to the drawings, wherein I have illustrated a present preferred form of my invention, the truck is provided with a relatively low frame having a forwardly projecting load supporting extension. The truck is provided at its rear end with a pair of driving wheels 11 mounted on the main frame portion. Extending upwardly from the rear end or main portion of the frame 10 is a suitable housing or frame structure designated in general at 16 forming a platform support for a housing or casing 18 within which are carried the batteries for the motor. A motor 20 is supported beneath the battery casing or housing 18 and is connected by mechanism hereinafter described to the driving wheels 11 for the purpose of driving the same.

A load elevating platform 24 extends forwardly from the frame structure 16 above the front load supporting frame extension, and is pivotally attached thereto at its forward end by means of a link frame 25 in any suitable manner such as by pins and brackets indicated at 25*a*. The rear end of the load elevating platform 24 is connected to the frame as well as to a motor 42 by means of a toggle mechanism. As shown in Figs. 2 and 3 this toggle mechanism in the present instance comprises a pair of links 30 attached at their lower ends to plates 31 by means of pivot pins 32. The plates 31 are attached to the side bars of the chassis 10 and depend therefrom. The upper ends of the links 30 are pivotally connected to the elevating platform 24 by means of a transverse bar 33 which is secured to suitable brackets 33*a* depending from the under side of the platform. Located intermediate the chassis side bars is a second link frame 35 connected at its upper end by means of the pivot bar 33 to the platform, and at its lower end pivoted to a link frame 36 intermediate the ends of the latter. The link frame 36 is pivoted at one end thereof to the chassis side bars by a transverse bar 37, and at its opposite end is pivotally attached to a threaded rod or ram 38.

Mounted on the ram 38 is a worm gear 39, the hub of which comprises a nut engaging the threads formed on the ram or shaft 38. The worm gear 39 is driven by a worm 40 and the latter is mounted on the shaft of an electrical motor 42. This motor 42 is electrically connected to the battery within the housing 18 and is controlled by suitable mechanism at the rear or operator's end 65 of the truck.

When the rod or ram 38 is retracted or drawn upwardly to operate the toggle mechanism, the elevating platform 24 is raised from the position shown in Figure 1 to the position shown in Figure 2, and hence the ram 38 will have a swinging movement. The motor 42, worm gear, etc. are accordingly mounted in a casing 43 which may be pivotally mounted at 44 (see Fig. 1) to permit the ram 38 to swing.

The truck is propelled by means of the motor 20 which is operatively connected to the driving wheels 11. The driving mechanism for these wheels is shown in Fig. 6 and comprises in general a worm 81 mounted on the motor shaft which meshes with a worm gear 82, the latter driving a shaft 84 through the medium of worm differential gears 83, the shaft 84 being connected to the wheel spindle 86 through the medium of a universal joint. The spindle 86 is drivingly connected to the wheel 11 by a closure plate 87 attached to the end of the spindle 86 to the hub of the wheel 11. Each of the driving wheels 11 is carried on a hollow sleeve 88 to which the steering arms 59 and 60 hereinafter described are rigidly attached. The sleeve 88 may be mounted upon the gear and shaft housing 89, while the latter is secured to the chassis frame 10.

Mounted beneath the load elevating platform 24 are a number of load carrying wheels of relatively small diameter and having each a relatively wide bearing surface. In the present instance, four dual load carrying wheels are mounted beneath the load elevating platform, these wheels being arranged in pairs spaced longitudinally of the truck and constructed to distribute the weight of the load over a considerable surface. These load carrying wheels comprise, in the present embodiment of the invention, a pair of forward wheels 6, 6*a* and 7, 7*a*, and a pair of wheels 8, 8*a* and 9, 9*a*, in rear thereof. All of the load carrying wheels in the present preferred form of the invention are mounted so as to turn relative to the chassis about a common turning center, and these wheels are carried by a carrier or sub-frame S.

As shown in Fig. 3 the chassis side bars 10 converge toward each other at the forward end of the truck beneath the platform 24 whereby the upper portions of the several load carrying wheels may be mounted between the vertical side flanges 24*a* of the elevating platform and the chassis side bars, thus providing an extremely low drop of the elevating platform.

The load wheels are mounted for rocking movement upon a carrier which in the present instance takes the form of a rocking sub-frame S comprising an integral spider-like construction including a central hub or housing 21 through which extends a transverse bar or shaft 23 supported by depending brackets 22 secured to the opposite sides of the chassis frame 10. In this manner, the sub-frame S is pivotally connected with the chassis. The sub-frame also includes a forward hub or axle member 121 and a rear hub or axle member 221 through which fixed shafts 200 and 205 respectively, extend. The intermediate or central pivoted portion 21 of the sub-frame is in the present instance connected to the axle members 121 and 221 preferably by means of pairs of diverging arms 321. These arms extend beneath the frame sills 10 and are so constructed and arranged with relation to the sills that they will not engage the sills when the sub-frame rocks about the pivot 23, as will be seen from Fig. 3*a*.

The lift platform is supported and operated to overlie in lowered position the frame sills in close proximity thereto, preferably to rest thereupon, and to be elevated to a predetermined position above the sills, depending upon the height of lift required. The sub-frame is so constructed and pivotally mounted on the sills as to permit rocking movement thereof and a substantial range of vertical articulation of the load wheels beneath the lift platform 24 in any position of the platform which is an important advantage in transporting a load when the platform is down, i. e. in its lowest position.

In the present instance where the invention has been embodied in a truck of ten ton capacity, the sills 10 comprise spaced structural steel channels having relatively wide vertically disposed central webs 10*a* and horizontal stiffening flanges 10b. The axle members 121 and 221 may each extend underneath the lower flanges 10b of the sills and in rear of the forward end thereof. Preferably they are spaced beneath or below the bottom horizontal plane of the load supporting sills so as to permit a predetermined range of rocking movement of the sub-frame. In the present instance the axle or hub members 121 and 221 may be provided with cut-away recesses or the like 121a and 221a whereby a maximum rocking movement may be obtained while preventing binding engagement of the load wheels with the bottom of the platform when down. In addition, greater strength may be obtained by virtue of the shafts 200 and 205 extending through the axle or hub members.

In the present instance each wheel structure preferably comprises a pair of independently rotatable sub-wheels 6, 6a; 7, 7a; 8, 8a; and 9, 9a. This construction enables the truck when carrying heavy loads such as ten tons to be turned by means of the steering mechanism on a short radius while minimizing any binding or skidding effect between the tire and the floor or ground. The construction therefore enables a load to be widely distributed by the means of wheels each of which turns on a separate radius in which the vertical turning axis of the knuckle or wheel axle is fixed with relation to the load.

Referring to Fig. 7, I have illustrated a manner of mounting the several load carrying wheels and their respective sub-wheels, each wheel being preferably identical in construction. The sub-wheels 6 and 6a comprise outer tire treads fixed to annular steel rims 100 and 100a respectively, each of which revolves freely and independently on a cylindrical hub or drum 101. The rims 100 and 100a may be mounted in abutting relation and the inner rim 100a is held against lateral displacement by means of an annular flange 104. A ring 102 is bolted at 102b at the outer edge of the drum or bearing 101 and is provided with a flange 102a which confines the outer edge of the rim 100, preventing lateral displacement thereof.

The ends of each of the shafts 200 and 205 which project beyond the ends of the sub-frame hubs or axle members are tapped to provide a vertical hole through which is threaded a pin 12. The pin 12 is rigidly fixed within the tapped hole in the end of the shaft 205 by means of a bolt 206 which clamps the split portions of the shaft onto the pin 12. The pin 12 rests upon a ball bearing 12a supported by the knuckle sleeve 105, the latter being free to turn about the axis of the pin 12. The drum 101 is provided with a central hub 101a mounted on the knuckle 105 and between the axle portion 105a of the knuckle and this hub are interposed suitable tapered roller bearings 106. These parts are held in position by means of a nut 105b. To the outer face of the hub is secured, by means of screws 103a, a cap 103. To the knuckle 105 of each of the load carrying wheels is secured beneath the end of the shaft 205, one of the steering arms 52, 47, 53 or 49, herein after described. From this construction it will be seen that each load wheel structure may be turned when steering the truck about the fixed vertical axis of the pin 12, and each wheel is free to revolve on the projecting axle portion of the knuckle.

It will also be noted that each knuckle with the steering arm 52 (47, 53 and 49) is located interiorly of the drum close to the central vertical axis of the drum passing through the center of gravity thereof. Each outer sub-wheel tread 6, 7, 8 and 9 is wider than the inner sub-wheel tread 6a, 7a, 8a and 9a, so that the weight of the load on each wheel will be centered on the outer wider tread. The foregoing construction provides a powerful leverage for turning each twin wheel structure, which is an important factor in enabling the load carrying wheels to be turned on a short radius without binding on the floor, irrespective of the weight of the load.

The several steering knuckles 105 which turn about the vertical axes 12 are therefore journalled to the projecting portions of the fixed shafts.

Mounted on these knuckles is a steering arm 46 for the wheels 6 and 6a and a steering arm 47 for the wheels 7 and 7a. A steering arm 48 is mounted on the knuckles for the wheels 8 and 8a, and a steering arm 49 is correspondingly provided for the wheels 9 and 9a. The steering arms 46 and 47 are connected by a transverse rod 50, and the steering arms 48 and 49 are connected by a transverse rod 51. The steering arm 46 is provided with an offset arm portion 52, and the steering arm 48 is provided with an offset arm 53, these offset portions being pivotally joined together by means of a connecting rod 54. The rod 54 is connected to a rearwardly extending rod 55 by means of a ball joint 154. This rod terminates adjacent the rear or driving end of the truck and is suitably connected to an arm 56 mounted adjacent the lower end of a vertically extending steering post 57. The steering post 57 at its upper end is connected to a horizontally extending stud shaft 58 (see Fig. 1), and this shaft is operated through the medium of reduction gearing (not shown) by means of a steering wheel 5.

The rear or driving wheels 11 are also mounted on steering knuckles 13 so as to turn relative to the chassis frame. Connected to the axle spindles of the driving wheels 11 are steering arms 59 and 60, which are connected together by means of a transverse rod or link 61. The arm 60 is provided with an offset arm 62 which is connected to the steering post 57 by means of a link 63 and an arm 64, as shown in Fig. 5.

The steering arms of the load carrying wheels and the driving wheels are constructed of varying lengths whereby the steering mechanism may be operated to cause all of the wheels to turn simultaneously about a common turning center or locus 70 (see Figs. 4 and 5). The turning center 70 at all times lies in a line 71 extending at right angles to the central longitudinal axis 72 of the truck, and this locus line 71 extends intermediate the normal axes of the front or driving wheels 11 and the intermediate sets of wheels 8, 8a, 9 and 9a, and as a result of this construction an extremely short turning radius may be obtained, as shown in Fig. 4.

This application is a continuation in part of my allowed application Serial No. 118,584, for industrial truck, filed June 25, 1926 and involved in interference proceedings at the time of issue of the present application. It will be understood that the design of the sub-frame may be varied and that the axle members, for instance, may be joined to the intermediate sub-frame portion in a different manner, within the scope of the claims. Other changes may of course be made within the spirit of the invention, as claimed, to satisfy different requirements of use or of load capacity.

I claim:

1. In an industrial lift truck having a frame comprising a main portion and power driven wheels at one end and a load supporting frame portion extending forwardly adjacent the ground, a lift platform surmounting said frame portion, longitudinally spaced pairs of dirigible load wheels of relatively small diameter and wide tread beneath said platform, a rocking sub-frame, means having a fixed connection with said frame portion for mounting said sub-frame to rock about a transverse axis, said sub-frame comprising an intermediate member and transverse axle members joined intermediate their ends by said intermediate member and having portions extending beyond opposite sides of said frame portion and being free to move vertically, a steering pivot mounted at the end of each axle member interiorly of the load wheel for supporting the wheel to move vertically with the axle member and for permitting the wheel to turn about an independent vertical axis.

2. In an industrial lift truck, a main frame at one end, driving wheels supporting the same, said main frame having a substantially narrower load supporting frame portion extending forwardly adjacent the ground, a lift platform surmounting said load supporting frame portion, a rocking sub-frame, said sub-frame comprising a central member extending below said frame portion and a pair of transverse axle members connected to opposite ends of the central member and extending transversely of said frame portion, a transverse shaft substantially shorter than said axle members having a fixed connection with said frame portion and carrying said central sub-frame member for rocking movement, and longitudinally spaced pairs of dirigible load wheels of relatively small diameter carried at the ends of said axle members beneath said lift platform and at the outer sides of said load supporting frame portion.

3. In an industrial power driven truck, a frame comprising a main portion at one end and a load supporting frame portion extending forwardly adjacent the ground, a lift platform surmounting said frame portion, longitudinally spaced pairs of dirigible load wheels of relatively small diameter and wide tread disposed beneath the platform, a rocking sub-frame carrying said load wheels and having a central portion mounted to rock about a pivot having a connection with said frame portion to provide a fixed range of lifting movement of the platform, said sub-frame also including transverse load wheel supporting members in front and rear of the pivot and connected to said central portion, said sub-frame and frame portion having cooperating portions providing a fixed range of rocking movement of the sub-frame about its pivot and a fixed range of vertical movement of the load wheels beneath the lift platform.

4. In an industrial lift truck, a frame comprising a main portion and a load supporting portion including sills extending forwardly adjacent the ground, a lift platform surmounting said sills, a sub-frame comprising an intermediate frame portion pivoted to the sills and a pair of transverse axle members connected to opposite ends of said frame portion, load wheels of relatively small diameter mounted at opposite ends of said axle members, said axle members extending beyond opposite sides of the sills and said sub-frame having portions adapted to cooperate with the sills to permit a fixed range of rocking movement of the sub-frame while preventing engagement of the load wheels with said platform.

5. In an industrial truck, a frame comprising a main portion at one end and a forwardly extending load supporting portion including a sill structure extending forwardly adjacent the ground, a load supporting platform surmounting said sill structure, power driven wheels supporting the main frame portion, a sub-frame comprising a central portion pivoted to the sill structure and a pair of transverse axle members mounted at opposite ends of said central portion and extending beneath the sill structure and beyond opposite sides thereof, dirigible load supporting wheels of relatively small diameter mounted adjacent the ends of said axle members, said load wheels being spaced longitudinally of the frame and disposed at opposite outer sides of the sill structure, and said axle members being spaced beneath the sill structure to permit predetermined rocking movement of the sub-frame about its pivot.

6. In an industrial truck, a frame comprising a main portion at one end and a forwardly extending load supporting portion including parallel sills extending forwardly adjacent the ground, a load supporting platform surmounting said sills, power driven wheels supporting the main frame portion, a sub-frame comprising a central portion pivoted to the sills, and a pair of transverse axle members mounted at opposite ends of said central portion and extending beneath the sills and beyond opposite sides thereof, dirigible load supporting wheels of relatively small diameter mounted adjacent the ends of said axle members, said load wheels being spaced longitudinally of the frame and disposed at opposite outer sides of the sills, said axle members having spaces beneath the sills to permit predetermined rocking movement of the sub-frame about its pivot while preventing engagement of the load wheels with said platform.

7. In an industrial truck, a frame comprising a main portion at one end and a forwardly extending load supporting portion including parallel sills extending forwardly adjacent the ground, a load supporting platform surmounting said sills, power driven wheels supporting the main frame portion, a sub-frame comprising a central portion pivoted to the sills, and a pair of transverse axle members mounted at opposite ends of said central portion and extending transversely of the sills and beyond opposite sides thereof, a shaft extending through each axle member, dirigible load supporting wheels of relatively small diameter mounted adjacent the ends of said shaft, said load wheels being spaced longitudinally of the frame and disposed at opposite outer sides of the sills, said axle members having spaces beneath the sills to permit predetermined rocking movement of the sub-frame about its pivot while preventing engagement of the load wheels with said platform.

8. In an industrial truck, the combination of a low mounted chassis having side bars that converge toward one another at the forward end of the truck, a load elevating platform having vertical side flanges mounted thereon, pairs of load carrying wheels spaced longitudinally of the truck positioned between the side bars and the vertical flanges, and a sub-frame pivotally connected to the chassis to rock on an axis transverse to the platform, said sub-frame being of substantially spider-like formation and including a central hub, a rear hub and a forward hub, certain of which are provided with cutaway portions adjacent the converging sections of the side bars, and shafts extending through said hubs and supporting the load carrying wheels.

9. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a pair of power-driven wheels beneath said upright housing, a plurality of pairs of relatively small load supporting wheels beneath said platform, the pairs of load supporting wheels being spaced longitudinally of said platform, and each load supporting wheel being dirigible about an independent vertical axis, means for simultaneously turning said load supporting wheels beneath the platform about their respective axes, sub-frame members carrying said wheels, and means for supporting said main frame on said driving wheels and sub-frame members to permit rocking movement of the latter about a horizontal axis and to prevent the weight of a load from causing any substantial angular lateral displacement of the main frame relative to the sub-frame axis irrespective of the position of the load.

10. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a pair of power-driven wheels beneath said upright housing, a plurality of pairs of relatively small load supporting wheels beneath said platform, the pairs of load supporting wheels being spaced longitudinally of said platform, and each load supporting wheel being dirigible about an independent vertical axis, means for simultaneously turning said load supporting wheels beneath the platform about their respective axes, sub-frame members carrying said wheels, and means for supporting said main frame on said driving wheels and sub-frame members to permit rocking movement of the latter about a horizontal axis extending transversely of the main frame in a vertical plane between the longitudinally spaced load supporting wheels, and to prevent the weight of a load, irrespective of its position, from causing any substantial angular lateral movement of the main frame relative to the axis of the sub-frame members under load.

11. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a plurality of pairs of relatively small and dirigible load supporting wheels beneath said platform, the pairs of wheels being spaced longitudinally of said platform, means for steering said wheels beneath the platform, and sub-frame members carrying said wheels, said sub-frame members having a pivotal connection with the main frame angularly fixed with relation thereto and permitting said members to rock about an axis, angularly fixed with relation to the main frame.

12. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a plurality of pairs of relatively small and dirigible load supporting wheels beneath said platform, the pairs of wheels being spaced longitudinally of said platform, means for steering said wheels beneath the platform, and sub-frame members carrying said wheels, said sub-frame members having a pivotal connection with the main frame fixed with relation thereto and permitting said members to rock about an axis substantially fixed with relation to the main frame.

13. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a pair of power-driven wheels beneath said upright housing, a plurality of pairs of relatively small load supporting wheels beneath said platform and spaced longitudinally of said platform, and each load supporting wheel being dirigible about an independent vertical axis, means for simultaneously turning said load supporting wheels beneath the platform about their respective axes, sub-frame members beneath the lift platform carrying said wheels, and means pivotally connecting said sub-frame members to the main frame for rocking movement beneath the lift platform about a horizontal axis, said connection being adapted to distribute the load uniformly from the main frame to said sub-frame members and to maintain the lift platform substantially fixed relative to the axis of said sub-frame members under load irrespective of the load position.

14. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a pair of power-driven wheels beneath said upright housing, a plurality of pairs of relatively small load supporting wheels beneath said platform and spaced longitudinally of said platform, each load supporting wheel being dirigible about an independent vertical axis, means for simultaneously turning said load supporting wheels beneath the platform about their respective axes, sub-frame members beneath the lift platform carrying said wheels, and means pivotally connecting said sub-frame members to the main frame for rocking movement beneath the lift platform about a horizontal axis extending transversely of the main frame in a plane between the pairs of longitudinally spaced wheels, said connection being adapted to distribute the load uniformly from the main frame to said sub-frame members and to maintain the lift platform substantially fixed against movement by the weight of the load relative to the axis of the sub-frame members, irrespective of the load position.

15. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a plurality of pairs of relatively small load supporting wheels beneath said platform, the pairs of wheels being spaced longitudinally of said platform, and each wheel being dirigible about an independent vertical axis, means for simultaneously turning said wheels beneath the platform about their respective axes, a unitary sub-frame carrying said wheels, and means for pivotally connecting the main frame to said sub-frame to permit rocking movement of the sub-frame, said means operative to maintain the lift platform substantially fixed against lateral angular movement relative to the sub-frame axis due to the weight of the load, irrespective of the position of the load.

16. In an industrial power-driven truck, a low mounted main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, a pair of power-driven wheels beneath said upright housing and a plurality of pairs of relatively small load supporting wheels beneath said platform and being spaced longitudinally of said platform, each load supporting wheel being dirigible about an independent vertical axis, means for simultaneously turning said load supporting wheels beneath the platform about their respective axes, and sub-frame members carrying said wheels and having a pivotal connection with the main frame constituting the sole load transmitting connection between said sub-frame members and the main frame.

17. In an industrial power-driven truck, a main frame having an upright housing at one end and extending forwardly therefrom adjacent the ground, a lift platform surmounting said forwardly extending frame portion and connected thereto to permit movement of the lift platform from a position closely adjacent said frame to a predetermined position above the frame, power-driven wheels beneath said upright housing, a plurality of pairs of relatively small load supporting wheels beneath said platform and spaced longitudinally of said platform, each load supporting wheel being dirigible about an independent vertical axis, means for simultaneously turning said load supporting wheels beneath the platform about their respective axes, and sub-frame members carrying said wheels, said sub-frame members being connected to said main frame for rocking movement about an axis which is constantly parallel to the plane of the lift platform and adapted to distribute the load uniformly from the main frame to said sub-frame members whereby to maintain the lift platform substantially level irrespective of the position of the load.

18. In an industrial power-driven truck, a main frame having an upright housing at one end and extending forwardly therefrom adjacent the ground, a lift platform surmounting said forwardly extending frame portion and connected thereto to permit vertical movement of the lift platform from a position closely adjacent said frame to an elevated position above the frame, a pair of power-driven wheels beneath said upright housing, two pairs of load supporting wheels beneath said platform and spaced longitudinally thereof, sub-frame members carrying said load wheels, a pivotal connection between said members and main frame to permit rocking movement of the sub-frame members, the axis of said pivotal connection extending transversely of the frame between said longitudinally spaced pairs of load wheels and located forwardly of the transverse center of the lift platform.

19. In an industrial power-driven truck, a main frame having an upright housing at one end and extending forwardly therefrom adjacent the ground, a lift platform surmounting said forwardly extending frame portion and connected thereto to permit vertical movement of the lift platform from a position closely adjacent said frame to an elevated position above the frame, a pair of power-driven wheels beneath said upright housing, two pairs of load supporting wheels beneath said platform and spaced longitudinally thereof, a unitary sub-frame structure carrying said load wheels, a pivotal connection between said sub-frame structure and main frame fixed with relation to the main frame and permitting rocking movement of the sub-frame, the axis of said pivotal connection extending transversely of the frame between said longitudinally spaced pairs of load wheels and located forwardly of the transverse center of the lift platform, and a common steering mechanism for turning each of said wheels about an independent vertical axis.

20. In an industrial power-driven truck, a frame having an upright housing at one end and extending forwardly therefrom adjacent the ground, an elevating platform surmounting said forwardly extending frame portion, a pair of power driven wheels beneath said upright housing, and a plurality of pairs of relatively small wheels having relatively wide traction surfaces beneath said platform, the pairs of wheels being spaced longitudinally of said platform, each wheel being dirigible about an independent vertical axis and means for simultaneously turning said wheels beneath the platform about their respective axes to steer the vehicle about substantially a common turning center, each of said wheel axles being disposed with respect to said turning center in a different radius whereby to permit short turning of the truck and distribution of the load supporting effect beneath the platform during turning, each of said platform supporting wheels comprising a bearing and a pair of independently revoluble sub-wheels mounted side by side on said bearing.

21. In an industrial power-driven truck, a frame having an upright housing at one end and extending forwardly therefrom adjacent the ground, an elevating platform surmounting said forwardly extending frame portion, a pair of power-driven wheels beneath said upright housing, a sub-frame beneath said first mentioned frame and platform rockable on an axis extending transversely of the truck, and a plurality of pairs of relatively small wheels having relatively wide traction surfaces beneath said platform, the pairs of wheels being spaced longitudinally of said platform and carried by said rocking frame, each wheel comprising a bearing and a pair of independently revoluble sub-wheels mounted side by side thereon, each pair of sub-wheels together being dirigible about an independent vertical axis, and means for simultaneously turning said wheels beneath the platform about their respective axes to steer the vehicle about substantially a common turning center, said wheels having their axles disposed with respect to said turning center in different radii whereby to permit short turning of the truck and distribution of the load supporting effect beneath the platform during turning.

22. In an industrial power-driven truck, a frame having an upright housing at one end and extending forwardly therefrom adjacent the ground, an elevating platform surmounting said forwardly extending frame portion, a pair of power-driven wheels beneath said upright housing, and a plurality of pairs of relatively small wheels having relatively wide traction surfaces beneath said platform, the pairs of wheels being spaced longitudinally of said platform, each wheel being dirigible about an independent vertical axis positioned interiorly of the wheel, sub-frame members beneath said frame pivotally connected to the frame for rocking movement about a horizontal axis extending transversely of the frame, said sub-frame members carrying said wheels, and means for simultaneously turning said wheels beneath the platform about their respective axes to steer the vehicle about substantially a common turning center, each of said wheel axles being disposed with respect to said turning center in a different radius whereby to permit short turning of the truck and distribution of the load supporting effect beneath the platform during turning.

23. In an industrial power-driven truck, a frame having an upright housing at one end and extending forwardly therefrom adjacent the ground, an elevating platform surmounting said forwardly extending frame portion, a pair of power driven wheels beneath said upright housing, a sub-frame beneath said first mentioned frame and platform rockable on an axis extending transversely of the truck, and a plurality of pairs of relatively small wheels having relatively wide traction surfaces beneath said platform, the pairs of wheels being spaced longitudinally of said platform and carried by said rocking frame, each wheel being dirigible about an independent vertical axis positioned interiorly of the wheel, and means for simultaneously turning said wheels beneath the platform about their respective axes to steer the vehicle about substantially a common turning center, said wheels having their axles disposed with respect to said turning center in different radii whereby to permit short turning of the truck and distribution of the load supporting effect beneath the platform during turning.

24. In an industrial power-driven truck, a main frame having a housing at one end and extending forwardly therefrom adjacent the ground, a lift platform surmounting said forwardly extending frame portion and connected thereto to permit movement of the lift platform toward and from the frame, a lifting mechanism for said platform, power-driven wheels beneath said upright housing, a plurality of pairs of relatively small load supporting wheels beneath said platform, the pairs of load supporting wheels being spaced longitudinally of said platform, steering mechanism for certain of said longitudinally spaced wheels beneath the platform, sub-frame means carrying said load supporting wheels, and means for supporting said main frame on said driving wheels and on the sub-frame means and its wheels to permit rocking movement of the latter about a horizontal axis extending transversely of the main frame in a vertical plane between the longitudinally spaced pairs of load supporting wheels.

25. In an industrial power-driven truck, a main frame having a housing at one end and extending forwardly therefrom adjacent the ground, a lift platform surmounting said forwardly extending frame portion and connected thereto to permit movement of the lift platform toward and from said frame, relatively small wheels disposed beneath said platform and spaced longitudinally of the frame, and sub-frame means carrying said wheels and having a pivotal connection with the main frame fixed with relation thereto and permitting said wheels to rock about a substantially horizontal axis substantially fixed with relation to the main frame whereby the lift platform has a substantially constant range of lifting movement under varying loads.

26. In an industrial power-driven truck, a main frame having a housing at one end, and extending forwardly therefrom adjacent the ground, a lift platform surmounting said forwardly extending frame portion and connected thereto to permit movement of the lift platform toward and from said frame, lifting mechanism for said platform, a plurality of pairs of relatively small load supporting wheels beneath said platform, the pairs of wheels being spaced longitudinally of said platform, means for steering certain of said longitudinally spaced wheels beneath the platform, sub-frame members carrying said wheels, said sub-frame members each having a pivotal connection with the main frame fixed with relation thereto and permitting said members each to rock about an axis substantially fixed with relation to the main frame whereby the lift platform has a substantially constant range of lifting movement under varying loads.

27. In an industrial truck, a low mounted main frame, a lift platform surmounting a portion of said frame and connected thereto to permit vertical movement toward and from the main frame, lifting mechanism for said platform, power-driven wheels for supporting the main frame in rear of said lift platform, load supporting wheels beneath the lift platform and spaced longitudinally thereof, steering means for the said longitudinally spaced wheels, and means for mounting said load supporting wheels to permit relative rocking movement thereof beneath the lift platform toward and from the latter while maintaining substantially a fixed range of vertical movement of the lift platform under varying loads relative to the axis of rocking movement.

28. In an industrial power-driven truck, a main frame having a housing at one end and extending forwardly therefrom adjacent the ground, a lift platform surmounting said forwardly extending frame portion and connected thereto to permit movement of the lift platform toward and from said frame, relatively small wheels disposed beneath said platform and spaced longitudinally of the frame, a truck steering mechanism for certain of said longitudinally spaced wheels, means movably connected to the main frame beneath the lift platform for permitting relative vertical articulation of the load supporting wheels beneath the lift platform while permitting substantially a constant range of lifting movement of the lift platform under varying loads relative to the axis of rocking movement.

29. In an industrial power-driven truck, a main frame having a housing at one end and extending forwardly therefrom adjacent the ground, a lift platform surmounting said forwardly extending frame portion and connected thereto to permit movement of the lift platform toward and from said frame, relatively small wheels disposed beneath the lift platform and spaced longitudinally of the frame, means for steering wheels beneath the platform, and sub-frame means carrying said wheels and pivotally connected to the main frame to permit said wheels to rock about an axis substantially horizontal and substantially fixed with relation to the main frame and disposed in a vertical plane between the wheels, whereby the lift platform has a substantially constant range of lifting movement under varying loads.

30. In an industrial power-driven truck, a main frame having a housing at one end and extending forwardly therefrom adjacent the ground, a lift platform surmounting said forwardly extending frame portion and connected thereto to permit movement of the lift platform toward and from said frame, wheels disposed beneath said platform and spaced longitudinally of the frame, steering mechanism for certain of said longitudinally spaced wheels beneath the platform, a member pivotally connected to the main frame carrying said wheels and extending therebetween, said member being connected to the main frame to permit relative vertical movement of the wheels beneath the platform by rocking movement of the member about its pivot while maintaining substantially a constant range of lifting movement of the lift platform under varying loads relative to the axis of rocking movement.

31. In an industrial power driven truck, a main frame having an upright housing at one end and extending forwardly therefrom adjacent the ground, a load supporting platform surmounting said forwardly extending frame, a pair of power-driven steering wheels beneath said upright housing, two pairs of relatively small load supporting wheels beneath said platform and spaced longitudinally thereof, a sub-frame member carrying said load wheels, a pivotal connection between said member and main frame to permit rocking movement of the sub-frame member about a fixed axis, the axis of said pivotal connection extending transversely of the frame between said longitudinally spaced pairs of load wheels, means for steering certain of said load wheels.

32. In an industrial power-driven truck, a frame comprising a main portion at one end and a load supporting portion disposed adjacent the ground, a platform surmounting said load supporting portion, a pair of power-driven steering wheels beneath said main portion, two pairs of relatively small load supporting wheels beneath said platform and spaced longitudinally thereof, a sub-frame member carrying said load wheels, a pivotal connection between said member and said frame to permit rocking movement of the sub-frame member about a fixed axis, the axis of said pivotal connection extending transversely of the frame between said longitudinally spaced pairs of load wheels, and means for steering certain of said load wheels.

33. In an industrial truck, a frame comprising a main portion at one end and a load supporting portion at the other end disposed adjacent the ground, a platform surmounting said load supporting portion and mounted to move upwardly and downwardly relative thereto, a pair of power-driven wheels beneath said main frame portion, pairs of relatively small load wheels beneath said platform and spaced longitudinally thereof, a sub-frame member carrying said load wheels, a pivotal connection between said member and said load supporting frame portion to permit rocking movement of said member about a fixed axis, the axis of said pivotal connection extending transversely of the frame between said longitudinally spaced pairs of load wheels, and means for steering certain of said load wheels.

34. In an industrial power-driven truck, a frame having a main portion and a load supporting portion, a lift platform surmounting said load supporting portion and mounted thereon to move upwardly and downwardly relative thereto, a pair of power-driven wheels beneath the main frame portion, a plurality of pairs of relatively small load supporting wheels beneath said platform, said pairs of load supporting wheels being spaced longitudinally of said platform and each said wheel being dirigible about an independent vertical axis, means for simultaneously turning certain of said load supporting wheels beneath said platform about their respective axes, sub-frame members carrying said load wheels, and means for supporting said main frame portion on said driving wheels and said load supporting portion on said sub-frame members to permit rocking movement of the latter about a horizontal axis and to prevent the weight of a load from causing any substantial angular lateral displacement of the frame relative to the sub-frame axis.

35. In an industrial power-driven truck, a frame having a main portion and a load supporting portion, a lift platform surmounting said load supporting portion and mounted thereon to move upwardly and downwardly relative thereto, a pair of power-driven wheels beneath said main frame portion, a plurality of pairs of relatively small load supporting wheels beneath said platform and spaced longitudinally thereon, each said load supporting wheel being dirigible about an independent vertical axis, means for simultaneously turning said load supporting wheels about their respective axes, sub-frame members beneath said lift platform carrying said wheels, and means pivotally connecting said sub-frame members to said load supporting frame portion for rocking movement beneath the lift platform about a horizontal axis, said connection being adapted to distribute the load uniformly from said load supporting frame portion to said sub-frame members and to maintain the lift platform substantially fixed relative to the axis of said sub-frame members under load irrespective of the load position.

36. In an industrial power-driven truck, a frame having a main portion and a load supporting portion, a lift platform surmounting said load supporting portion and mounted thereon to permit movement of the lift platform from a position closely adjacent said load supporting portion to a predetermined position thereabove, a pair of power driven wheels beneath said main portion and a plurality of pairs of relatively small load supporting wheels beneath said platform and spaced longitudinally thereof, each said load supporting wheel being dirigible about an independent vertical axis, means for simultaneously turning said load supporting wheels about their respective axes, and sub-frame members carrying said wheels and having a pivotal connection with said load supporting portion constituting the sole transmitting connection between said sub-frame members and the frame.

37. In an industrial power-driven truck, a frame having a main portion and a load supporting portion, a lift platform surmounting said load supporting portion and mounted thereon to move upwardly and downwardly relative thereto, a pair of power-driven wheels beneath said main portion, two pairs of load supporting wheels beneath said platform and spaced longitudinally thereof, sub-frame members carrying said load wheels, a pivotal connection between said members and said load supporting portion to permit rocking movement of said sub-frame members, the axis of said pivotal connection extending transversely of said load supporting portion between said longitudinally spaced pairs of load wheels and located forwardly of the transverse center of said lift platform.

38. In an industrial truck, a frame having a relatively low load supporting portion, a lift platform surmounting said load supporting portion and mounted to move upwardly and downwardly relative thereto, power driven wheels for supporting said frame rearwardly of said lift platform, load supporting wheels beneath the lift platform and spaced longitudinally thereof, steering means for the longitudinally spaced wheels, and means for mounting said load supporting wheels to permit relative rocking movement thereof beneath the lift platform toward and from the latter while maintaining substantially a fixed range of vertical movement of the lift platform under varying loads relative to the axis of rocking movement.

39. In an industrial power driven truck, a frame having a main portion and a load supporting portion extending forwardly adjacent the ground, a lift platform surmounting said load supporting portion, a pair of power driven wheels beneath said main frame portion, a plurality of pairs of relatively small load supporting wheels beneath said platform and spaced longitudinally thereof, each of said load supporting wheels being dirigible to turn about an independent vertical axis to steer the truck, sub-frame members beneath said lift platform carrying said wheels, and means pivotally connecting said sub-frame members to said load supporting frame portion for rocking movement beneath the lift platform about a horizontal axis fixed with relation to said frame portion.

40. In an industrial power-driven truck, a frame having a main portion and a load supporting portion extending forwardly adjacent the ground, a lift platform surmounting said load supporting portion, a pair of power-driven wheels beneath said main frame portion, a plurality of pairs of relatively small load supporting wheels beneath said platform and spaced longitudinally thereof, each of said load supporting wheels being adjustable to turn about an independent vertical axis to steer the truck, sub-frame members beneath said lift platform carrying said wheels, and a member having a fixed pivotal connection with said load supporting frame portion for permitting rocking movement of said sub-frame members beneath the lift platform.

41. In an industrial power-driven truck, a frame comprising a main portion at one end and a load supporting portion disposed adjacent the ground, a platform surmounting said load supporting portion, a pair of power-driven steering wheels beneath said main portion, two pairs of relatively small load supporting wheels beneath said platform and spaced longitudinally thereof, a sub-frame member carrying said load wheels, a pivotal connection between said member and said frame to permit rocking movement of the sub-frame member about a fixed-position axis, the axis of said pivotal connection extending transversely of the frame between said longitudinally spaced pairs of load wheels, and means for steering certain of said load wheels.

42. In an industrial truck, a frame comprising a main portion at one end and a load supporting portion at the other end disposed adjacent the ground, a platform surmounting said load supporting portion and mounted to move upwardly and downwardly relative thereto, a pair of power-driven wheels beneath said main frame portion, pairs of relatively small load wheels beneath said platform and spaced longitudinally thereof, a sub-frame member carrying said load wheels, a pivotal connection between said member and said load supporting frame portion to permit rocking movement of said member about a fixed-position axis, the axis of said pivotal connection extending transversely of the frame between said longitudinally spaced pairs of load wheels, and means for steering certain of said load wheels.

ROBERT T. ROMINE.